July 19, 1927.

H. E. WEBER

HOSE COUPLING

Filed Feb. 10, 1921

1,636,579

2 Sheets-Sheet 1

Inventor

Henry E. Weber

By Frease, Merkel, Saywell and Bond

Attorneys

July 19, 1927.   H. E. WEBER   1,636,579
HOSE COUPLING
Filed Feb. 10, 1921   2 Sheets-Sheet 2
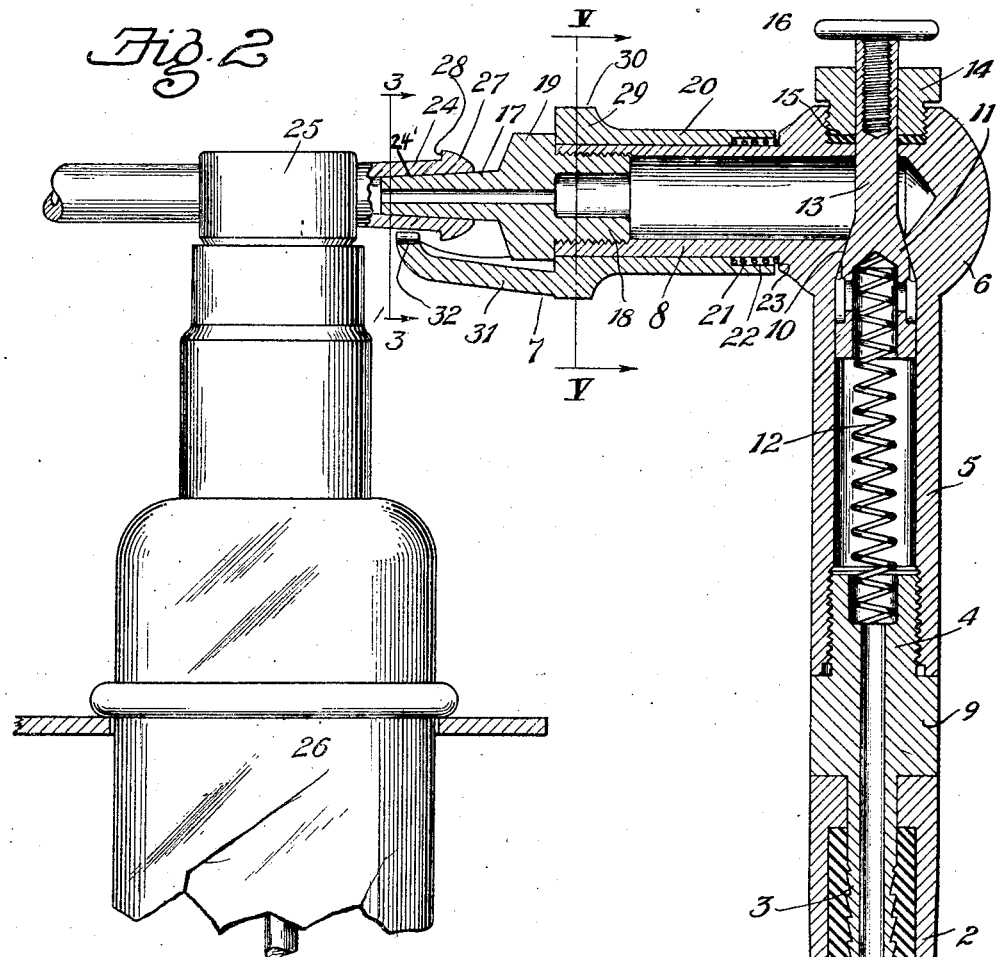
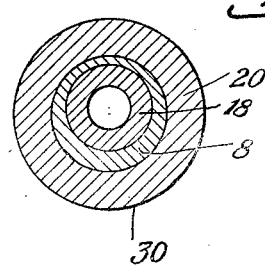
Inventor
Henry E. Weber
By Frease, Merkel, Saywell and Bond
Attorneys Patented July 19, 1927.

1,636,579

UNITED STATES PATENT OFFICE.

HENRY E. WEBER, OF CANTON, OHIO.

HOSE COUPLING.

Application filed February 10, 1921. Serial No. 443,946.

The invention relates to a device for connecting two separable members, such as an air hose to an atomizer or other like appliance, as for use in dental or medical surgery; and the objects of the improvement are to provide a coupling device upon the extremity of an air hose for readily connecting the same in clamping engagement with the siphon head of an atomizer and also to serve as a handle for operating the atomizer, and to provide an air valve in the hose fitting so arranged that the hose may be attached to and detached from the atomizer and the valve operated by the use of one hand only of the operator.

In dental surgery, the use of a plurality of atomizers each containing a different solution is necessary or desirable, and the atomizers are usually mounted in a carrier located within reach of the operator, and the present improvement involves the use of an elbow fitting for the air hose with the valve located in one branch which forms a handle for the coupling and having the valve stem protruding from the other side of the elbow, and by providing a coupling nipple on the other branch of the elbow and mounting clamping means on the same branch so that the valve stem and the coupling clamp may be operated by the thumb and forefinger of a hand while grasping the elbow which carries the valve and the coupling.

The coupling per se comprises a conically flared tubular head having a spherical rim on the atomizer, and a conically tapered nipple on the hose fitting adapted to enter the bore of the flared head, and a rotatable eccentric sleeve on the same branch of the fitting having a cam arm adapted to be clamped against or released from the side of the tubular head by a rotation of the eccentric sleeve.

A preferred embodiment of the invention is illustrated in the accompanying drawings forming part hereof in which—

Figure 1:
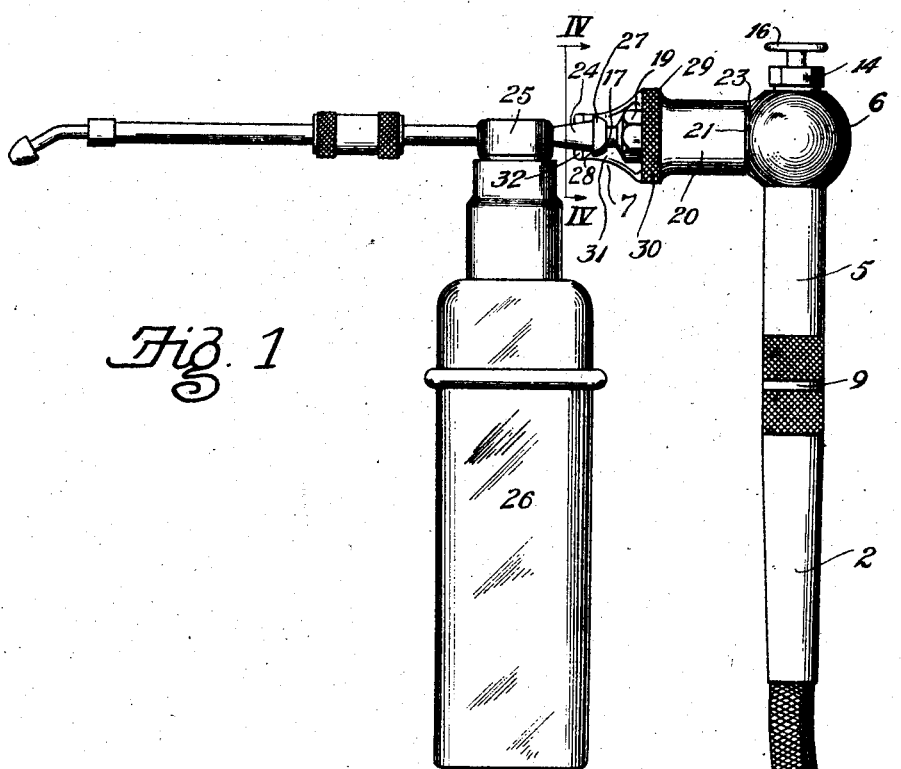
Figure 3:
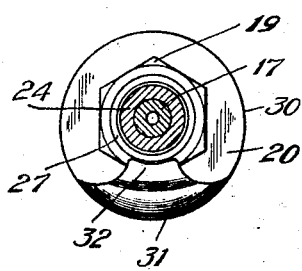
Figure 4:
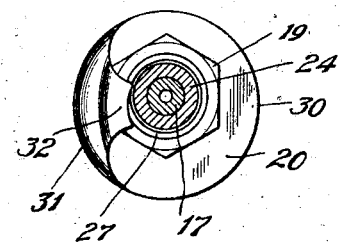

Figure 1 is a side elevation of the improved hose coupling applied to an atomizer;

Fig. 2, an enlarged elevation section of the same;

Fig. 3, a section on line 3—3, Fig. 2, showing the clamping arm released from the tubular head;

Fig. 4, a section on line IV—IV, Fig. 1, showing the coupling clamped to the tubular head;

Fig. 5, a section on line V—V, Fig. 2.

Similar numerals refer to like parts throughout the drawings.

The flexible hose 1 is secured as by means of a ferrule 2 to the tubular stem 3 of the tubular plug 4 which is screwed into the end of the longer stem 5 of the elbow fitting 6 which forms a handle for the coupling 7 on the shorter shank 8 of the fitting; there being a cylindric head 9 on the plug intervening between the end of the hose and the end of the fitting so as to extend the inflexible handle downward to include the plug head 9 as well as the ferrule 2, the length of which is sufficient to accommodate the hand grasp of an operator.

A conical seat 10 is formed in the handle stem of the fitting for the reversely coned valve 11 which is held to its seat by the compression spring 12 extending from the valve to the plug 4, and the valve stem 13 extends through a plug 14 provided with suitable packing 15 in the opposite wall of the elbow and has a disk head 16 on its outer end by which the valve may be opened by pressure of the thumb of the operator, while the hand grasps the fitting.

The conical nipple shank 17 is secured as by screwing its tubular end 18 into the tubular shank 8 of the fitting, there being a nut 19 on the nipple forming a shoulder abutting the end of the tubular shank and extending outward therefrom to form an abutment for a rotatable sleeve 20 which is eccentrically mounted on the tubular shank of the fitting and is preferably frictionally held in a given position of rotation by means of a compression spring 21 located in a counter-bore 22 in the other end of the sleeve and abutting a shoulder 23 formed on the elbow.

A conically flared tubular head 24 extends laterally from the siphon head 25 of an atomizer 26 of any well known type, and forms an axial socket 24' which is preferably tapered like the conical nipple 17; and the periphery of the tubular head is formed concentric with the axis of the socket, and is preferably provided with a spherical segment rim 27 forming a tapered end for the head and a shoulder 28 adjacent thereto.

The end of the eccentrically mounted sleeve 20 is enlarged to form a rim 29 having a knurled periphery 30 by means of which the sleeve may be readily rotated by the thumb and forefinger of the hand which grasps the tubular stem 5 and from one side of this rim a flange arm 31 extends forward and is provided with an inturned end 32 adapted to clamp against or be released from the side of the flared tubular head 24 by a rotation of the sleeve when the conical nipple 17 is inserted in the head 24.

As shown in Fig. 5, the eccentric sleeve is so arranged that the clamping arm 31 will be farthest removed from the axis of the coupling when it is in its lowermost position, as shown in Figs. 2 and 3, in which position the end 32 of the arm is free to pass the rim 27 of the tubular head of the atomizer; and the nipple 17 of the hose fitting is free to be withdrawn from and re-inserted into the tubular head.

The parts are so proportioned and arranged that by rotating the eccentric sleeve 20 a quarter turn one way or the other, the arm will be clamped against the periphery of the tubular head 24, as shown for one side in Figs. 1 and 4, thereby firmly holding the coupling together and permitting the atomizer to be manipulated by the elbow fitting as a handle.

By these means, an operator can pick up the hose coupling by grasping the elbow with one hand, and can engage and clamp the coupling with any one of a plurality of atomizers or other appliance; after which the coupling elbow becomes a handle by which the atomizer can be withdrawn from its rack for use in surgical work, at the completion of which the atomizers can be returned to the rack and the coupling released and withdrawn from the atomizer; all without requiring the operator to use the other hand, which is thus left for other work.

For the use and operation of the coupling, it is not essential that the head, shank and other parts shall be tubular, but the same is of course necessary when the coupling is used for a hose or other form of conduit.

I claim:—

1. A coupling including two separable members, a head on one member having an axial socket therein and a concentric periphery, a shank on the other member for inserting into the socket, and an eccentrically mounted sleeve on said other member having an arm for clamping the periphery of the tubular head by a rotation of the sleeve.

2. A coupling including two separable members, a tubular head on one member having an axial socket therein and a concentric periphery, a nipple on the other member for inserting into the socket, and an eccentrically mounted sleeve on said other member having an arm for clamping the periphery of the tubular head by a rotation of the sleeve.

3. A coupling including two separable members, a head on one member having a conical axial socket therein and a concentric periphery, a tapered shank on the other member for inserting into the socket, and an eccentrically mounted sleeve on said other member having an arm for clamping the periphery of the tubular head by a rotation of the sleeve.

4. A coupling including two separable members, a head on one member having a rim shoulder with an axial socket therein and a concentric periphery, a shank on the other member for inserting into the socket, and an eccentrically mounted sleeve on said other member having an inturned arm for clamping the periphery of the tubular head by a rotation of the sleeve.

5. A coupling including two separable members, a flared tubular head on one member having an axial socket therein and a concentric periphery, a shank on the other member for inserting into the socket and an eccentrically mounted sleeve on said other member having an arm for clamping the periphery of the tubular head by a rotation of the sleeve.

6. A coupling including two separable members, a head on one member having an axial socket therein and a concentric periphery, a shank on the other member for inserting into the socket, and an eccentrically mounted sleeve on one of the members having an arm for clamping the periphery of the other member by a rotation of the sleeve.

HENRY E. WEBER.